US011267758B2

(12) United States Patent
Wang

(10) Patent No.: US 11,267,758 B2
(45) Date of Patent: Mar. 8, 2022

(54) WALL COMPOUNDS AND METHODS OF USE

(71) Applicant: 3M INNOVATIVE PROPERTIES COMPANY, St. Paul, MN (US)

(72) Inventor: DanLi Wang, North Oaks, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 103 days.

(21) Appl. No.: 16/641,210

(22) PCT Filed: Aug. 22, 2018

(86) PCT No.: PCT/US2018/047488
§ 371 (c)(1),
(2) Date: Feb. 21, 2020

(87) PCT Pub. No.: WO2019/040601
PCT Pub. Date: Feb. 28, 2019

(65) Prior Publication Data
US 2020/0290927 A1  Sep. 17, 2020

Related U.S. Application Data

(60) Provisional application No. 62/548,845, filed on Aug. 22, 2017, provisional application No. 62/574,858, filed on Oct. 20, 2017.

(51) Int. Cl.
*C04B 26/06* (2006.01)
*C04B 14/22* (2006.01)
(Continued)

(52) U.S. Cl.
CPC .............. *C04B 26/06* (2013.01); *C04B 14/22* (2013.01); *C04B 14/305* (2013.01);
(Continued)

(58) Field of Classification Search
None
See application file for complete search history.

(56) References Cited

U.S. PATENT DOCUMENTS 3,365,315 A   1/1968   Beck
3,709,706 A   1/1973   Sowman
(Continued)

FOREIGN PATENT DOCUMENTS

WO   WO 2015-134856   9/2015
WO   WO 2015-152862   10/2015
(Continued)

OTHER PUBLICATIONS

US 6,027,799 A, 02/2000, Castle (withdrawn)
(Continued)

*Primary Examiner* — John J Figueroa
(74) *Attorney, Agent, or Firm* — 3M IPC

(57) ABSTRACT

A wall compound for use in all applications and particularly well-suited for joining adjacent wallboards. The compound includes a latex resin, a thickener, fibers, and a filler material. In some embodiments, the repair compound is configured to exhibit at least one of yield stress and pseudoplastic-type behavior. In some embodiments, the compound includes hydrophobic and hydrophilic fibers of different morphologies. In some embodiments, the wall compound includes one or more associative thickeners.

18 Claims, 2 Drawing Sheets

(51) Int. Cl.

| | |
|---|---|
| *C04B 14/30* | (2006.01) |
| *C04B 16/06* | (2006.01) |
| *C04B 24/28* | (2006.01) |
| *C04B 26/02* | (2006.01) |
| *C04B 26/22* | (2006.01) |
| *C04B 26/28* | (2006.01) |
| *C04B 103/44* | (2006.01) |
| *C04B 111/00* | (2006.01) |

(52) U.S. Cl.
CPC ...... *C04B 16/0625* (2013.01); *C04B 16/0691* (2013.01); *C04B 24/282* (2013.01); *C04B 26/026* (2013.01); *C04B 26/22* (2013.01); *C04B 26/285* (2013.01); *C04B 2103/44* (2013.01); *C04B 2111/00637* (2013.01); *C04B 2111/00672* (2013.01)

(56) References Cited

U.S. PATENT DOCUMENTS

| | | |
|---|---|---|
| 4,155,892 A | 5/1979 | Emmons |
| 4,166,147 A | 8/1979 | Lange |
| 4,391,646 A | 7/1983 | Howell |
| 4,824,879 A | 4/1989 | Montgomery |
| 5,164,265 A | 11/1992 | Stubbs |
| 5,281,654 A | 1/1994 | Eisenhart |
| 5,486,219 A | 1/1996 | Ford |
| 8,334,357 B2 | 12/2012 | Schieferstein |
| 8,461,213 B2 | 6/2013 | Münzenberg |
| 8,507,587 B2 | 8/2013 | Gozum |
| 8,507,857 B2 | 8/2013 | Itou |
| 8,524,649 B2 | 9/2013 | Leyrer |
| 8,697,797 B2 | 4/2014 | Suau |
| 8,871,817 B2 | 10/2014 | Türk |
| 9,522,976 B2 | 12/2016 | Tabor |
| 9,683,143 B2 | 6/2017 | Negri |
| 9,828,782 B2 | 11/2017 | Wang |
| 2003/0163957 A1 | 9/2003 | Chen |
| 2005/0060947 A1 | 3/2005 | McArdle |
| 2014/0017973 A1 | 1/2014 | Lin |
| 2014/0056642 A1 | 2/2014 | de Vries |
| 2014/0083035 A1* | 3/2014 | Negri ................ C08K 7/28 52/353 |
| 2015/0224537 A1 | 8/2015 | Palaikis et al. |
| 2017/0066946 A1* | 3/2017 | Moyer, Jr. ............ E04B 1/6803 |
| 2018/0179109 A1* | 6/2018 | Gozum .................. C04B 26/28 |

FOREIGN PATENT DOCUMENTS

| | | |
|---|---|---|
| WO | WO 2015-195430 | 12/2015 |
| WO | WO 2016-066910 | 5/2016 |
| WO | WO 2016-106167 | 6/2016 |
| WO | WO 2017-088104 | 6/2017 |
| WO | WO 2017-112584 | 6/2017 |

OTHER PUBLICATIONS

Samaržija-Jovanović, "Thermal Behavior of Modified Urea-Formaldehyde Resins", Journal of Thermal Analysis and Calorimetry, 2011, vol. 104, No. 03, pp. 1159-1166.

Zhang, "The Influence of Nano-Cellulose and Silicon Dioxide on the Mechanical Properties of the Cell Wall with Relation to the Bond Interface between Wood and Urea-Formaldehyde Resin", Journal of the Society of Wood Science and Technology, 2015, vol. 15, No. 03, pp. 249-257.

International Search Report for PCT International Application No. PCT/US2018/047488, dated Oct. 11, 2018, 5 pages.

* cited by examiner

WALL COMPOUNDS AND METHODS OF USE

CROSS REFERENCE TO RELATED APPLICATIONS

This application is a national stage filing under 35 U.S.C. 371 of PCT/US2018/047488, filed Aug. 22, 2018, which claims the benefit of provisional Application No. 62/574,858, filed Oct. 20, 2017, and provisional Application 62/548,845, filed Aug. 22, 2017, the disclosure of which is incorporated by reference in its/their entirety herein.

TECHNICAL FIELD

The present disclosure relates generally to materials such as paste or putties, which are used to join adjacent wall panels and repair blemishes or defects in wall surfaces.

BACKGROUND

In the construction of buildings and residential remodeling, one of the most common elements is gypsum wallboard, often known as drywall, used in the construction of walls and/or ceilings. Walls made from gypsum wallboard are traditionally constructed by affixing panels to wood studs or metal framing. Two side-by-side panels disposed in the same plane will form a joint seam between them on vertical walls and horizontal ceilings. The joints between adjacent wallboard panels are filled using a composition commonly called joint compound to conceal the joints and create the appearance of a monolithic surface. The side edges of the drywall panels can be tapered, allowing the joint compound to be applied to the seam, between adjoining panels, in such a way that a monolithic surface is created when finished.

When cavities, recesses, holes, etc., are present (due to imperfections or damage) in exterior or interior surfaces such as walls and ceilings, it is common to use a wall repair compound, and in particular a spackling compound, to fill such cavities. Conventional spackling compounds often include one or more inorganic fillers, one or more polymeric resin binders, and various thickeners and other additives. Lightweight spackling compounds have been developed that often contain, among other inorganic fillers, relatively low density fillers such as glass bubbles, hollow silica, or expanded perlite. After the spackling compound is applied to a wall the water evaporates over time resulting in the formation of a dried, hardened material that can be sanded, painted, etc. While spackling compounds and joint compounds do many of the same things and are both smeared onto walls to hide flaws, spackling compounds are generally lighter, dry more quickly, sand more easily, and are more expensive than joint compounds. For simplicity, the term "wall compound" as used throughout the present disclosure is inclusive of spackling compounds and joint compounds.

The procedure for concealing the joint between adjacent wallboards, and thereby producing a smooth seamless wall surface, typically includes applying soft wet joint compound within the joint or seam 3 formed by the abutting edges of adjacent wallboard panels 1, 2 using a trowel 4 or the like. One typical implementation of this process is depicted in FIG. 1. A fiberglass, cloth, or paper reinforcing tape material (e.g., joint reinforcing tape) 10 is embedded within the wet joint compound 20, and the compound 20 is allowed to harden. After the joint compound 20 has hardened, at least a second layer of joint compound 30 is applied over the joint 3 and tape 10 to completely fill the joint 3 and provide a smooth surface. This layer is also allowed to harden. One or more additional compounds 40, either joint compounds or finishing compounds, may also be applied and allowed to harden. Upon hardening of the final coat layer, the joint seam 3 is sanded smooth to eliminate surface irregularities. Paint or a wall covering, such as wall paper, can then be applied over the joint compound so that the joint and the drywall compound may be imperceptible under the paint or wall covering. The same joint compound can also be used to conceal defects caused by the nails or screws used to affix the wallboard panels to the studs or other framing, or to repair other imperfections in the wallboard panels.

The taping operation referenced above involves several repetitive steps, making it a time-consuming process in drywall finishing. One taping process requires a mechanical tool commonly referred to as a bazooka, which is fitted with a roll of paper tape and filled with ready mixed joint compound which has been mixed with sufficient water. As the head of the bazooka is placed over the joint and moved down the wall, the tape advances and the backside is coated with a thin coat of joint compound which holds it loosely to the wallboard. A second worker will often have to follow behind the bazooka wiping the tape tight to the wall and removing excess joint compound from over the tape. If the joint compound does not flow evenly over the back side of the tape, blisters may occur which are often not seen until the taping coat is dry. In this case, the tape must be removed from the joint and a thin film of joint compound and piece of tape reapplied before the next stage of finishing can be reached.

The materials conventionally used to finish wall assemblies create significant inefficiencies in the process and also require an advanced level of skill to use effectively. For example, existing joint compounds can require up to three separate coats to be applied to fasteners as well as multiple coats applied to flat seams between boards in the same plane and to corner seams. Each coat must separately dry which introduces significant downtime in the construction process, particularly since the other construction trades ordinarily cannot work as effectively, if at all inside the building while the wall finishing occurs. Each layer of joint compound can require about a day to dry, and it can typically take several days to weeks to install the gypsum board and finish the flat joints, fasteners, and corner trims for a typical new construction of a home. Since all joint filling operations are highly labor intensive, the total cost is often extremely high when compared to the cost of the composition employed.

SUMMARY

The inventors of the present disclosure recognized that the process for joint filling could be significantly improved by reducing the number of applications of joint compound and eliminating the taping step. In light of the above, the inventors of the present disclosure recognized a need for a tape free joint compound that provides a quick dry with minimal to no shrinking and/or cracking once dried. Furthermore, an improved joint composition useable without tape would desirably be easily spread over a given joint area, without at least one of sagging or running once applied.

The present inventors discovered that prior compositions purporting to offer the above properties often failed to provide at least one of compositional stability, ease of application, workable open time, relatively short drying times, and resistance to sagging. Attempts to alleviate issues with sagging in such compositions often deleteriously impacted the ease of application and/or severely prolonged the drying time. Similarly, attempts to improve the ease of application resulted in compositions that were not storage-stable, and/or compositions that sagged upon most geometries of application. Exploration of impact on the desired performance by use of traditional rheology modifiers, such as cellulosic rheological modifiers and gelling clays, as well as dust reducing additives (e.g., oils, waxes, glycols, and other petroleum derivatives) yielded compounds that lacked component solubility/stability or adhered poorly to requisite wallboard surfaces.

Surprisingly, the present inventors discovered that select packages of associative thickeners can be combined with low shrinkage fillers in a latex resin to provide a wall compound meeting or exceeding the performance requirements expected and desired of joint compounds. The present disclosure accordingly provides wall compounds that have reduced to rapid dry times while still possessing desirable attributes of easy application, workable open time, and resistance to sagging. The wall compounds further provide low to no shrinkage and low to no cracking upon drying. Satisfactory filling can be effected in two applications, and often in a single application, dramatically reducing labor cost and increasing efficiency in interior building construction.

Some aspects of the present disclosure are directed toward a wall compound particularly well-suited for joint seam filling. In some embodiments, the compound can be used to fill a joint seam in the absence of a reinforcement tape. Wall compounds of the present disclosure can also be suitable for filling and repairing relatively large holes or cavities (e.g., major dimension of at least 2 inches), cracks or other imperfections in a surface (such as, for example, a gypsum wallboard surface), as well as virtually any other, smaller wall surface imperfection. The wall compound includes a latex resin, a thickener package, fibers, and a filler material. The wall compound is configured to exhibit at least one of yield stress and pseudoplastic-type behavior. In some embodiments, wall compounds of the present disclosure include one or more of (1) hydrophobic and hydrophilic fibers of different morphologies. (2) associative, polyurethane containing thickeners. (3) a bimodal distribution of hollow glass microspheres from two different strength/size curves, and (4) organometallic adhesion promoters.

Further embodiments provide a method for affixing and holding two panels together at a joint seam, comprising a step of creating a joint seam by positioning two panels side-by-side such that the panels abut; and a step of applying the wall compound to the joint seam and some panel surface area around the seam. At least some embodiments, the method is performed without joint reinforcement tape. In other embodiments, the wall compound is provided as part of a kit. In some embodiments, the kit includes a tool.

DETAILED DESCRIPTION

Figure 1:
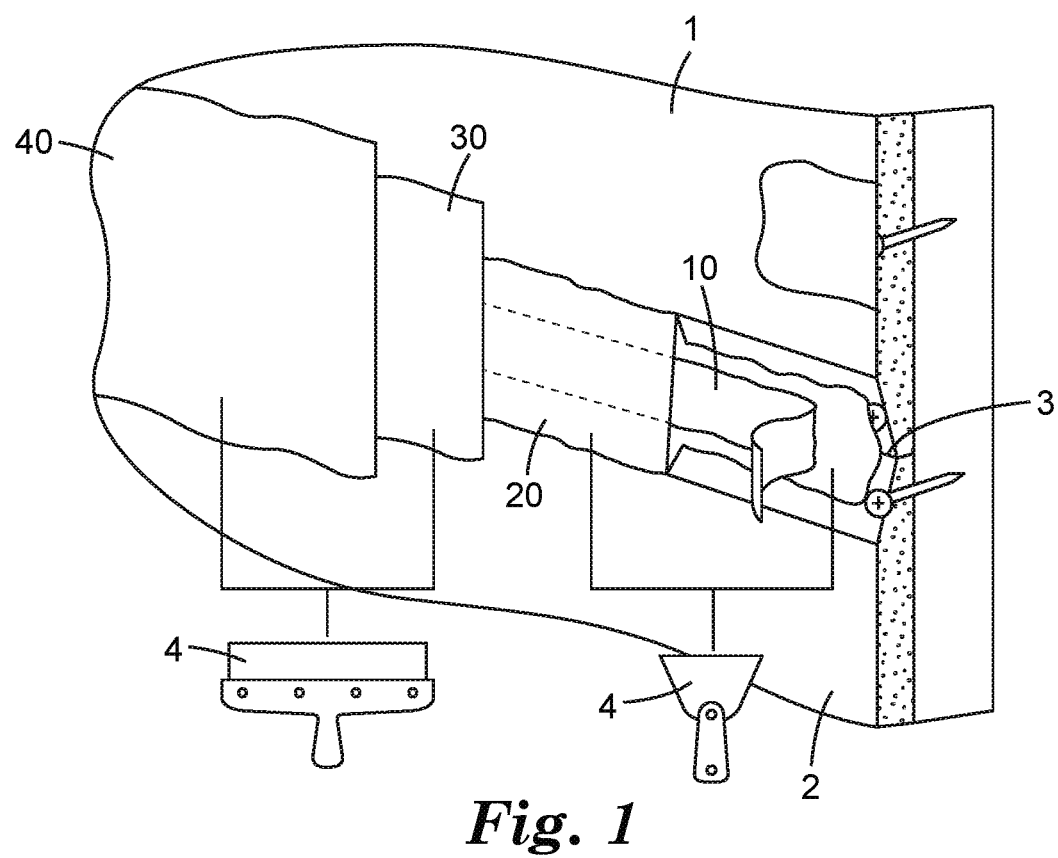
FIG. 1 is an illustration of the procedure for concealing the joint between adjacent wallboards.

Various embodiments and implementations will be described in detail. These embodiments should not be construed as limiting the scope of the present disclosure in any manner, and changes and modifications may be made without departing from the spirit and scope of the inventions. For example, many of the embodiments, implementations, and examples are discussed with specific reference to wall repair, but these should not be construed to limit the application scope to this one exemplary implementation. Further, only some end uses have been discussed herein, but end uses not specifically described herein are included within the scope of the present disclosure. As such, the scope of the present disclosure should be determined by the claims.

Wall compounds of the present disclosure are suitable for filling a joint seam, with or without reinforcement tape. In particularly advantageous embodiments, the wall compounds can fill a seam and provide a monolithic surface without the need for joint reinforcement tape. The wall compounds of the present disclosure exhibit a yield stress and/or pseudoplastic-type behavior and can be lightweight (e.g., having a density of not more than 6 lbs/gal, alternatively not more than 5 lbs/gal, alternatively not more than 4 lbs/gal, and alternatively not more than 3.5 lbs/gal).

The wall compounds of the present disclosure possess, in one or more combinations, three identifiable rheological properties: a low viscosity under large stress to make application easy, a high viscosity under low stress to prevent creeping flow after application, and yield stress behavior to resist sagging or running after application.

Wall compounds of the present disclosure generally include a latex resin, a thickener package, fibers, and a synthetic filler material. Other optional ingredients may be included in various other embodiments. In some embodiments, the thickener in combination with the fibers produces a wall compound exhibiting yield stress fluid and/or pseudoplastic-type behavior. In some embodiments, the filler material has a bimodal distribution of glass bubbles, which results in a lightweight wall compound. In other embodiments, the filler material is a single class of substantially spherical synthetic filler. In some embodiments, the wall compound is a wall repair compound. In some embodiments, the wall compound is a wood repair compound.

Resin

The wall compounds of the present disclosure comprise at least one latex resin or resin binder, such as a polymeric resin binder conventionally viewed as being useful with wall compounds. Such binders are often supplied as an aqueous latex emulsion (for example, comprising between 15-60 percent solids of polymeric resin binder, in water). Exemplary polymeric resins potentially suitable for binders of the present disclosure include, for example, the well-known vinyl acrylic polymers and copolymers, acrylic polymers and copolymers, polyvinyl acetate polymers and copolymers, ethylene vinyl acetate polymers and copolymers, styrene-butadiene polymers and copolymers, polyacrylamide polymers and copolymers, natural rubber latex, natural and synthetic starch, casein, and the like. Such binders can be used alone or in combination with one another. In some embodiments, the resin or resin binder is 100% acrylate. In some embodiments, the resin or resin binder portion of the wall compound includes at least one latex resin and at least one non-latex resin. In some embodiments, the latex and non-latex resin form a uniform blend.

In some embodiments, the latex resin is an acrylic latex emulsion binder. For example, the resin can be a vinyl acrylic latex emulsion binder available from Arkema Coating Resins of Cary, N.C., under the trade designation ENCOR 379G. The ENCOR 379G latex is a high molecular weight polymer that delivers very high scrub resistance and durability in both interior and exterior architectural coatings. This polymer combines high molecular weight with an optimized glass transition temperature to produce flexible films with excellent grain crack resistance and long-term durability. Further, vinyl acrylic latex emulsions, such as the ENCOR 379G, can exhibit sufficient tolerance to loading of the optional filler material described below.

In some embodiments, the acrylic latex emulsion binder (e.g., ENCOR 379G) is combined with another latex binder (e.g., DOW ENCOR 627 or 626 or 631 or NEOCAR Latex 2300 or NEOCAR Latex 2535).

The latex emulsion resin can comprise at least about 20, 30, 40, or 50 percent, by weight, of the wall compound in some embodiments.

In some embodiments, the resin or resin binder has a Tg of greater than 10 degrees C. In some embodiments, the resin or resin binder has a Tg of greater than 20 degrees C. In some embodiments, the resin or resin binder has a Tg of greater than 25 degrees C. In some embodiments, the resin or resin binder has a Tg of greater than 29 degrees C.

Thickener

The wall compounds of the present disclosure include a thickener package. The thickener package provides an enhanced initial viscosity (i.e., viscosity under low or no shear stress) for the wall compounds such that the compound does not excessively sag, slump, or run (e.g., when applied to a vertical wall) but yields to flow easily once sufficient shear stress is applied.

Suitable thickeners are compatible with the composition, meaning that when the thickener is combined with the resin binder, a smooth-flowing, homogeneous liquid mixture is formed, from which, a dried coating is obtained at room temperature. Addition of the thickener typically should not coagulate the composition (e.g., form semi-solid or solid clumps and/or gel particles). Preferably, the thickener imparts pseudoplastic (shear thinning) behavior to the composition, meaning that the viscosity decreases with increasing shear rate. In some embodiments, the thickener imparts "short viscosity" to the composition, meaning that a filament of the composition breaks at very short lengths and the composition does not form "strings" when drawn out. The amount of thickener required in the composition depends on the thickener chemistry and viscosity desired.

The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Other examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; and styrene-maleic anhydride terpolymers (SMAT); associative thickeners such as hydrophobically modified ethoxylated urethanes (HEUR); hydrophobically modified polyethers ("HMPE"): and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Associative thickening may involve dynamic, non-specific interactions of hydrophobic end groups of a thickener molecule with itself and with other components of a formulation. Associative thickening is particularly suitable to water-based wall compounds of the present disclosure, where the thickener is able to modify gloss, flow, shear, leveling, spatter resistance, or other properties.

The wall compounds of the present disclosure comprise a thickener package including at least one polyurethane-containing thickener as a primary thickener and an associate thickener as a secondary thickener. In certain implementations, the thickener packaged includes HEUR and an alkali swellable emulsion. HEUR can be assembled from a hydrophilic diol (e.g., a polyethylene glycol of 6,000-8,000 g/mol), a polyisocyanate, and a hydrophobic monol or diol. The cycloaliphatic polyester polyols can be utilized to supplement or replace the hydrophobic monol or diol. In some embodiments, the thickener package includes HEUR and an ASE. In other embodiments, the thickener packaged includes HEUR and HASE. In yet other embodiments, the thickener package includes HEUR, HASE, and ASE. In yet further embodiments, the thickener package includes an HASE. Exemplary HEUR and HASE associative thickeners and their methods of preparation may be found in, e.g., U.S. Pat. No. 8,871,817 (Turk et al.); U.S. Pat. No. 8,697,797 (Suau et al.); U.S. Pat. No. 8,524,649 (Leyrer et al.); U.S. Pat. No. 8,461,213 (Muezenberg et al.): U.S. Pat. No. 8,334,357 (Schieferstein et al.); U.S. Pat. No. 5,281,654 (Eisenhart et al.); and U.S. Pat. No. 4,155,892 (Emmons et al.). Exemplary, commercially available HEUR thickeners are sold under the trade designation ACRYSOL® RM-12W by Dow Chemical, Midland, Mich., USA and COAPUR XS 83, by Coatex, Inc., Genay, France. An exemplary, commercially available ASE is sold under the trade designation ACRYSOL® 6038A by Dow Chemical. Exemplary HASE thickeners are available from Coatex, Inc. under the trade designations THIXOL 53L, RHEOTECH 4800, and RHEOTECH MO2.

The thickener package can be included in any suitable amount, e.g., to achieve a desired viscosity. In some embodiments, the thickener package is included in an amount from about 0.01% to about 5%, by weight of the wet composition, such as from about 0.01% to about 3%, from about 0.01% to about 2%, from about 0.1% to about 2%, or from about 0.1% to about 1%, by weigh of the total wall compound as formulated.

The wall compound typically comprises from about 0.001 wt. % to about 1 wt. %, about 0.01 wt. % to about 0.6 wt. % and 0.05 wt. % to 0.25 wt. % of the primary, polyurethane based thickener, by weight of the total wall compound as formulated.

Below this range, the thickener may not provide sufficient increase in viscosity, and the composition may be too runny or insufficiently stable for wallboard joining applications. Above this range the composition does not spread as easily or does not exhibit the desired yield stress behavior.

Alternatively, other thickeners conventionally employed with wall compounds may be used, for example to provide an increased viscosity of the wall compounds such that the compound does not excessively sag, slump or run (e.g., when applied to a vertical wall).

While various ones of thickeners described above may be used with the wall compounds of the present disclosure, it has been found that clay-type thickeners are too dense for use in the wall compounds described herein. Further, it has been found that cellulosic thickeners may impart excessive lubricity to the wall compound (as formulated with the other components or ingredients of the present disclosure) and make it hard for the wall compounds described herein to stick in the seam or hole. Accordingly, in presently preferred implementations, the thickener package does not include either one of clay-type thickeners and cellulosic thickeners.

Fibers

The wall compounds of the present disclosure further include fibers. In some embodiments, the wall compounds include two (or more) different types of fibers. In some embodiments, the fibers are selected in conjunction with the selected thickener to impart yield stress behavior and/or pseudoplastic behavior into the wall compound, as well as to enhance performance of the wall compound in joining adjacent wallboards or repair defects in a wall surface.

The fibers can assume a variety of forms, and in some embodiments, include a first fiber type selected to provide one or more desired performance attributes, and a second fiber type that is also selected to provide desired performance attributes, but that differ from that or those of the first fiber type. For example, the first fiber type can be selected to provide one or more of general reinforcement, crack resistance, reduced shrinkage, viscosity control, particle suspension, shear thinning, improved dimensional stability without absorbing other ingredients or reducing shelf life, etc. The second fiber type can be selected to provide porosity control and absorbency (as well as reinforcement).

With the above explanations in mind, in some embodiments, the first fiber type is a hydrophobic fiber and the second fiber type is a hydrophilic fiber. In related embodiments, a nominal length of the first fiber type is less than the nominal length of the second fiber type, for example on the order of 10× less.

In some embodiments, the fibers of the present disclosure include a mixture of hydrophobic dry fibrillated polyethylene fibers and hydrophilic rayon fibers. The dry fibrillated polyethylene fibers can have a nominal size that is less than a nominal size of the hydrophilic rayon fibers. For example, the hydrophobic dry fibrillated polyethylene fiber can have nominal dimension on the order of 15 microns in diameter and 0.55-0.80 mm in length, whereas the hydrophilic rayon fibers can have nominal dimensions on the order of 4.5 denier by 0.5 inch. The dry fibrillated polyethylene fibers as combined with the thickener provide one or more of general reinforcement, crack resistance, reduced shrinkage, viscosity control, particle suspension, shear thinning, and improved dimensional stability without absorbing other ingredients or reducing shelf life. The hydrophilic rayon fibers as combined with the thickener provide one or more of porosity control and absorbency, and reinforcement.

In some embodiments, the two different fiber types augment desired performance attributes of the thickeners described above, allowing for the use of a lesser amount of the thickener (as compared to conventional spackling compound formulations). The hydrophilic rayon fiber (for example) can serve to distribute stress over a larger area in the wall compound upon drying. Regardless, in some embodiments, the thickener and fibers combine to render the wall compound to exhibit a pseudoplastic-type behavior as described below.

In some embodiments, the wall compound of the present disclosure may include less than about 1 percent by weight of the hydrophobic dry fibrillated polyethylene fibers (or equivalent fibers), and further include less than about 1 percent by weight of the hydrophilic rayon fibers (or equivalent fibers). In related embodiments, the wall compound of the present disclosure may include a greater amount (by weight) of the hydrophilic rayon fiber (or equivalent fibers) than the hydrophobic dry fibrillated polyethylene fibers (or equivalent fibers).

In some embodiments, the fiber(s) is/are present in total in an amount of no greater than about 3 percent, no greater than about 2 percent, or no greater than about 1 percent, by weight of the total wall compound as formulated.

Filler

The wall compounds of the present disclosure further include a filler. In some embodiments, the filler is an inorganic filler system that comprises one or more inorganic fillers. In some embodiments, the inorganic filler system includes synthetic inorganic fillers. The term "synthetic inorganic filler" as used herein includes any filler that has been transformed, regenerated, recrystallized, reconstituted, etc., from an original state which may be its naturally occurring, mined state into its current state by a chemical synthesis process (e.g., precipitated from solution, generated by flame hydrolysis, etc.) or by a physical synthesis process (e.g., precipitated from a gaseous phase, solidified by way of a sol-gel process, etc.). The term "synthetic inorganic filler" as used herein also includes any filler that has been substantially transformed from an original state (which may be its naturally occurring, mined state) into its current state by a physical synthesis process of being brought into an at least partially softened or molten state and then solidified by cooling, such that any substantially crystalline structure that may have existed in the natural state is substantially erased such that the material is now in a substantially amorphous form (e.g., comprising less than about 0.5 percent crystallinity by weight). Such processes may include, for example, melt processing, flame-fusion and the like.

Using the definitions provided above, synthetic inorganic fillers include, for example, so-called glass bubbles or microspheres (such as those available from 3M Company of St Paul, Minn., under the trade designation 3M Glass Bubbles), ceramic microspheres (such as those available from 3M Company under the trade designation 3M Ceramic Microspheres), synthetic clays (e.g., synthetic silicate clays such as those available under the trade designation Laponite from Southern Clay Products of Gonzales. Tex.), precipitated silica, fumed silica, vitreous silica, synthetic titanium dioxide (as made, for example, by the sulfate process or the chloride process), synthetic (precipitated) calcium carbonate (as made, for example, by passing carbon dioxide through a solution of calcium hydroxide), and the like. In this context, the term "synthetic inorganic fillers" includes such synthetic inorganic fillers as have been modified to include organic surface groups, coatings, etc.

In certain embodiments, the synthetic inorganic fillers used herein comprise a bimodal particle size mixture of larger synthetic inorganic filler particles and smaller synthetic inorganic filler particles. In various embodiments, the synthetic inorganic filler used herein comprises a bimodal particle size mixture of synthetic inorganic filler particles comprising a particle size ratio of larger size filler to smaller size filler (as obtained by rationing the medium particle size of the two filler populations) of at least about 5:1. Other embodiments of the present disclosure lack a bimodal distribution and feature one average size of filler particles.

In some embodiments, such synthetic inorganic fillers are comprised of substantially spherical particles. In this context, the term "substantially spherical" denotes that a substantial majority of the particles are spherical except for such occasional deviations, deformities, etc., as are known to those of skill in the art to be occasionally encountered in the manufacturing processes used to produce the particles (for example, somewhat misshapen particles may occasionally be produced, two or more particles may agglomerate or adhere to each other, and so on).

Suitable substantially spherical synthetic inorganic fillers as defined herein include so-called glass bubble and ceramic microspheres. Such glass bubbles can be synthesized, for example, by a process as described in U.S. Pat. Nos.

3,365,315 and 4,391,646, incorporated herein in their entirety. Such ceramic microspheres can be synthesized, for example, by sol-gel processes, as described for example in U.S. Pat. Nos. 3,709,706 and 4,166,147, incorporated herein in their entirety. Other methods potentially useful for making ceramic particles and/or microspheres are described in, for example, U.S. Pat. No. 6,027,799, incorporated herein in its entirety.

In some embodiments, the synthetic inorganic filler used herein comprises a bimodal particle size mixture of larger substantially spherical synthetic inorganic filler particles and smaller substantially spherical synthetic inorganic filler particles. In related embodiments, the synthetic inorganic filler used herein comprises a bimodal distribution or mixture of first and second substantially spherical synthetic inorganic filler particles, with a density and/or strength of each of the first substantially spherical synthetic inorganic filler particles being greater than a density of each of the second substantially spherical synthetic inorganic filler particles. In further related embodiments, the synthetic inorganic filler comprises a bimodal distribution of hollow glass microspheres from two different strength/size curves. For example, the first substantially spherical synthetic inorganic filler particles are glass bubbles or microspheres having a mean particle size on the order of 50-55 microns and a density on the order of 0.2 g/cc, and the second substantially spherical synthetic inorganic filler particles have a mean particle size on the order of 20 microns and a density on the order of 0.45 g/cc. For example, the first substantially spherical synthetic inorganic filler particle can be Glass Bubbles available from 3M Company of St. Paul, Minn. under the trade designation K20, and the second substantially spherical synthetic inorganic filler particles can be Glass Bubbles available from 3M Company of St. Paul, Minn. under the trade designation iM16K.

The K20 glass bubble and the iM16K glass bubble exhibit different size and strength properties. When collectively employed as part of a wall compound, it has surprisingly been found that the synthetic inorganic filler (as a bimodal distribution) provides sufficient strength for the resultant wall compound while reducing the wall compound's density (as compared to conventional spackling compounds). In some embodiments, the synthetic inorganic filler comprises a bimodal mixture of larger, less dense glass bubbles (e.g., K20 Glass Bubbles) at about 20-30 percent by weight, and about 2-10 percent by weight of the second, smaller/harder glass bubble (e.g., iM16K Glass Bubbles).

Optional Ingredients

Wall compounds of the present disclosure may optionally include one or more additional components for various purposes. Exemplary additives include, but are not limited to, adhesion promoters, activators, smoothing agents, solvents, dispersing agents, surfactants, humectants, colorants, and preservatives.

For example, an adhesion promoter can be employed to provide secure attachment of the wall compound to a wall and/or ceiling surface. The adhesion promoter can assume a variety of forms as known to those of skill in the art, and can include a titanium alkoxide adhesion promoter, such as an adhesion promoter available from Chartwell International, Inc. under the trade designation B-515.71W. In some embodiments, the wall compounds may include less than about 1 percent by weight of an adhesion promoter.

In some embodiments, the wall compounds of the present disclosure can include an activator or pH control agent to activate one or more of the thickeners described above (e.g., an HASE thickener may not activate or thicken the mixture at a pH less than 8.5). For example, and as described in greater detail below, in some embodiments, formulation of the wall compound can include adjustment of the pH to about 9 to allow for activation of the thickener. Where provided, the activator or pH control agent can assume a variety of forms known in the art and appropriate for use with a wall compound, and for example can be an amino alcohol such as available from Dow Chemical Company under the trade designation AMP-95. Where provided, the wall compound can include less than about 0.15 percent by weight of the activator or pH control agent.

In some embodiments, the wall compounds of the present disclosure may include one or more smoothing agents, such as one or more organic ether smoothing agents, found to advantageously affect the consistency of the compound. In some embodiments, the optional smoothing agent, such as an organic ether smoothing agent, at the concentrations disclosed herein can impart a smooth consistency to the wall compound (absent the smoothing agent, the wall compound may take on a crumblier appearance) such that the wall compound is more easily spreadable it does not run, sag, slump or crumble, once applied, e.g., to a vertical wall. In contrast to the above-described thickeners, such optional smoothing agents appear to function to reduce the apparent viscosity of the wall compound rather than to increase it (while, again, not causing unacceptable sagging or slumping). Some examples of acceptable smoothing agents useful with the wall compounds of the present disclosure are described in U.S. Pat. No. 8,507,587, the teachings of which are incorporated herein in their entirety.

In various embodiments, the wall compounds described herein may include one or more organic ether smoothing agents. In some embodiments, the organic ether smoothing agent(s) is/are present in total in an amount of at most about 2.5 percent at most about 1.5 percent, or at most about 0.5 percent, by weight of the total wall compound as formulated. In various additional embodiments, the one or more organic ether smoothing agents are present in total in an amount of at least about 0.025 percent, at least about 0.05 percent, or at least about 0.15 percent, by weight.

Suitable organic ether smoothing agents may be chosen, for example, from those products available from Dow Chemical under the trade designations DOW P-Series Glycol Ethers and DOW E-Series Glycol Ethers (including, for example, various products available under the trade designations DOWANOL, CARBITOL, and CELLOSOLVE), and mixtures thereof. In some embodiments, organic ether smoothing agents are chosen from organic ethers that comprise exactly one hydroxyl group and exactly one ether group. This group includes, for example, propylene glycol butyl ether (available from Dow Chemical under the trade designation DOWANOL PnB), propylene glycol methyl ether (available from Dow Chemical under the trade designation DOWANOL PM), as well as other products available from Dow Chemical under the DOWANOL, CARBITOL, and CELLOSOLVE trade designations, and mixtures thereof. In other embodiments, optional smoothing agents are chosen from organic ethers that comprise exactly one hydroxyl group and exactly two ether groups. In yet other embodiments, optional smoothing agents are chosen from organic ethers that comprise exactly one hydroxyl group and exactly three ether groups. In yet other embodiments, optional smoothing agents are chosen from organic ethers that comprise at least one ether group and that do not contain any hydroxyl groups.

In addition to the components discussed above, other components may be added to the wall compound. These may include, for example, water, which may be added at the end of the production process, for final adjustment of e.g., viscosity. Thus, in certain embodiments, water (in addition to the water optionally present in the aqueous acrylic latex binder emulsion) may be added to the formulation.

The components may be stabilized in a bulk water phase by employing one or more surfactants. In various embodiments, the surfactant is anionic in nature and is the structure thereof not otherwise particularly limited. Non-limiting examples of anionic surfactants include ammonium, sodium, lithium, or potassium salts of lauryl sulfonic acid, dioctyl sodium sulfosuccinic acid, ammonium, sodium, lithium, or potassium salts of perfluorobutanesulfonic acid, ammonium, sodium, lithium, or potassium salts of perfluorooctanesulfonic acid, ammonium, sodium, lithium, or potassium salts of perfluorooctanoic acid, sodium dodecyl sulfate, sodium dodecylbenzenesulfonate, sodium laureth sulfate, sodium lauroyl sarcosinate, sodium myreth sulfate, sodium pareth sulfate, ammonium, sodium, lithium, or potassium salts of stearic acid, and combinations of one or more thereof. A dispersing agent may be added to the wall compound composition for wetting and/or stabilization purposes. The dispersing agent can be a non-ionic or an anionic compound, typically a polymer, such polyvinyl pyrrolidone. Such dispersing agents are known in the art. The proportion of dispersing agent and/or surfactant will typically depend upon the dispersant or surfactant or combinations used and the particular wall compound composition.

The wall compounds described herein may further include humectants to control loss of water or other solvent during use or storage. Suitable humectants for use in the compositions include polyfunctional alcohols, such as propylene glycol, glycerol, polyglycerols, trimethylol propane, polyether glycols, sorbitol and/or low molecular weight starch hydrolyzates which have been converted into the corresponding polyols by reduction with hydrogen, and mixtures thereof.

Other additives that may be present include preservatives that may have advantageous effects on the wall compound during storage and may also serve to minimize the degree to which mold or fungus may grow on the dried wall compound. Thus, in certain embodiments, the wall compounds disclosed herein can optionally comprise at least about 0.1, 0.2 or 0.3 percent by weight of a preservative or preservatives. In further embodiments, the wall compounds disclosed herein optionally comprise at most about 0.8, 0.6 or 0.4 percent by weight of a preservative or preservatives. Suitable preservatives include, for example, those available under the designation Mergal 186 and Polyphase P20T, from Troy Corporation of Florham Park, N.J. The wall compounds disclosed herein can also comprise dust reducing additives, which in some circumstances may serve to further reduce the quantity of airborne dust particles generated when sanding the dried, hardened wall repair compound. Exemplary additives may include oils (such as mineral oils, vegetable oils, and animal oils), waxes (including natural and synthetic waxes), and the like.

To enhance the ability of the wall compound to "hide" or blend in with the visual appearance of the wall or ceiling surface, the wall compound may also optionally include one or more colorants or primers. One suitable colorant or primer is, for example, titanium dioxide. While not wishing to be bound by theory, it is believed that titanium dioxide reflects light and thereby effectively hides differences in the substrate color/appearance when added to the wall compound formulation. Another exemplary suitable colorant is carbon black. Specific commercially available colorants suitable for use in the wall compound of the present disclosure include MONARCH 120 carbon black available from Cabot Corporation of Boston, Mass. and TI-PURE R700 titanium dioxide available from DuPont Chemicals of Wilmington, Del. In some embodiments, where provided, the amount of colorant is greater than 8% by weight. In some embodiments, the amount of colorant is less than about 20 percent by weight. In some embodiments, the amount of colorant is less than about 10 percent by weight. In some embodiments, the amount of colorant is less than 1 percent by weight, all percentages being of the total wall compound as formulated.

Yield Stress & Pseudoplastic Behavior

Regardless of whether one or more of the optional components mentioned above are included, the wall compounds of the present disclosure are formulated to exhibit yield stress behavior. As used herein, the terms "yield stress fluid" and "yield stress behavior" refers to a material or composition that possesses the properties of a solid in the absence of shear stress and the properties of a fluid (e.g., liquid) under sufficient shear stress. In some embodiments, the wall compounds of the present disclosure exhibit pseudoplastic-type behavior in addition to or in lieu of yield stress behavior. As used herein, the term "pseudoplastic" refers to a material or composition that exhibits shear thinning without significant initial resistance to deformation. The wall compounds behave as non-Newtonian fluids under most use conditions, but may also show linear (Newtonian) behavior at the highest levels of stress and shear rate.

The yield stress behavior promotes easy spreading of the wall compound on to a surface (such as a surface adjacent a wallboard joint), but once the user has stopped spreading, the wall compound quickly stops flowing. In some embodiments, the yield stress behavior is achieved by using a polyurethane-containing thickener package (e.g., HEUR based) in combination with hydrophobic dry fibrillated polyethylene fibers (or similar fiber material), hydrophilic rayon fibers (or similar fiber material), and suitable substantially spherical synthetic inorganic fillers (e.g., glass bubbles).

In some embodiments, the wall repair compounds of the present disclosure can have a yield stress value or yield value (the force that must be applied to a fluid layer before any movement is produced) meaning it has an initial resistance to flow under stress but then is shear thinning, and when used, exhibits "cling," meaning it has the ability at rest, to return to a pseudo-plastic or thixotropic gel. However, at stresses below the yield value, the viscosity increases substantially and resists flow, which is useful for preventing sagging or running after application. In presently preferred implementations, the yield value is sufficiently high to prevent sagging or running before or after spreading, and yet does not inhibit the mixing or application of the wall compound.

In some embodiments, the wall compound can have a yield stress value of at least 200 Pa, in some embodiments, at least 350 Pa, in some embodiments at least 500 Pa, in some embodiments at least 600 Pa, in some embodiments at least 750 Pa, in some embodiments at least 1000 Pa.

In some embodiments, the wall compound can have a yield stress value of no greater than 2000 Pa, no greater than 1750, no greater than 1500 Pa. and in some embodiments no greater than 1250 Pa. For wall compounds particularly useful as joint compounds, the yield stress value is typically less than 1000 Pa. This can help ensure the compound exhibits the desired fluid behavior upon shear stress levels that may be easier for a user to generated by hand or tool.

In some embodiments, the wall compounds exhibit a viscosity at a stress of 500 Pa of a least 3000 Pa·s, in some embodiments at least 10,000 Pa·s, in some embodiments at least 25.000 Pa·s and in some embodiments at least 50,000 Pa·s (as measured accordingly to the Rheology Test Method as described below). In some embodiments, the wall compounds exhibit a Viscosity at 1500 Pa of stress of no greater than 10 Pa·s, in some embodiments no greater than 9 Pa·s, in some embodiments no greater than 8 Pa·s, in some embodiments no greater than 7 Pa·s, in some embodiments no greater than 5 Pa·s, in some embodiments no greater than 4 Pa·s, in some embodiments no greater than 3 Pa·s, and in some embodiments no greater than 2 Pa·s.

In presently preferred implementations particularly suitable for use in joint filling, the wall compounds of the present disclosure have a relatively low yield stress value combined with a relatively high viscosity at low to no shear and a rapid transition to low viscosity upon application of sufficient force. It is desirable to have a high initial viscosity in order that the compound can be as strong and thick as possible as applied to seams and yet have the lowest possible viscosity so as to allow the compound to be easily spread across wallboards and joints.

The wall compounds are suitable for filling a joint seam, with or without reinforcement tape. In particularly advantageous embodiments, the wall compounds can fill a seam and provide a monolithic surface without the need for joint reinforcement tape. The wall compounds of the present disclosure can be employed to repair a plethora of wall surface imperfections or defects (e.g., holes, cracks, etc.). Further, the wall compounds of the present disclosure are well-suited to be applied into a larger hole (e.g., hole with a major dimension of at least 2 inches) in a vertical wall surface (e.g., following placement of a backing material or panel onto a backside of the wall in a region of the hole).

In some embodiments, the wall compound of the present disclosure can be provided to an end user as part of a kit. Exemplary kits can further include one or more tools, optionally a backing device for establishing a scaffolding structure "behind" the hole for receiving the wall compound (e.g., non-limiting examples, of which are described in U.S. Pat. No. 9,828,782, entitled "Wall Hole Repair Device, Kit, and Method", etc.

Methods of Use

The wall compounds of the present disclosure can be formulated and applied in a manner akin to conventional spackling compounds, including the user spreading a quantity of the wall compound into the hole and along an interior or exterior wall surface surrounding the hole with a spreading tool. In some embodiments, the wall compounds may be used with a conventional caulking tool. In other embodiments, the wall compounds of the present disclosure can be provided to a user with a reduced water content (akin to a dough material). The corresponding methods of use of the present disclosure include the user rolling a volume of the dough-like wall compound to shape with the user's hand(s), and then inserting and pressing the shaped compound into the hole or other defect.

The wall compounds of the present disclosure are also well suited for adhering construction panels and fortifying joints. The wall compounds can be used without joint reinforcement tape, which saves time and makes wall installation more accurate and reliable. The present wall compounds are thus suitable in installation of various construction panels. These panels include, but are not limited to, gypsum wallboards, paperless gypsum panels and gypsum and/or cement-based tiles. In some embodiments, joint seams are filled with one or more layers of wall compound and the composition is allowed to self-level and create a polymerized matrix over the joint and some panel surface area. The seam can be then sanded if needed and is ready for decorative painting or another wall covering.

In some embodiments, one or more finishing compounds are applied to surface of a wall compound matrix. The finishing compound can provide a smoother outer surface than certain implementations of wall compound, potentially reducing the amount of time spent sanding or otherwise improving the appearance of the joint seam. Finishing compounds of the present disclosure generally include a latex resin, a thickener package, and a synthetic filler material. Other optional ingredients (such as smoothing agents, colorants, primers and others listed above) may be included in various other embodiments. Finishing compounds typically lack fibers of the type described herein, as fibers can potentially contribute to a rougher or uneven surface upon drying. Suitable finishing compounds are described, for example, in U.S. Pat. No. 8,507,857, entitled "Lightweight Wall Repair Compounds". For example, a finishing compound may include about 45 wt. % resin, about 25% synthetic filler, about 0.2 wt % thickener, water, and other additives, each by weight of the total finishing compound as formulated.

In particular, advantageous circumstances, the use of a wall compound and a finishing compound can reduce the time necessary to fill joint seams by up to 50%, as the typical filling process of the prior art requires at least 3 coats or application steps for satisfactory completion (see FIG. 1).

In some other embodiments, the wall compound can be pre-made and stored on a shelf until needed. In other alternatives, the wall compounds can be prepared from a kit at a construction site by mixing components such as fibers, a resin, a thickener package, and synthetic filler, and other components together with water.

EMBODIMENTS

1. A wall compound comprising: a latex resin or resin binder, a thickener package; hydrophobic dry fibrillated fibers and hydrophilic fibers, and a filler material, wherein the filler consists of substantially spherical synthetic inorganic filler, wherein the wall compound exhibits yield stress behavior.

2. The wall compound of embodiment 1, wherein the latex resin or resin binder is one of a vinyl acrylic polymer or copolymer, an acrylic polymer or copolymer, an acrylate polymer or copolymer, a polyvinyl acetate polymer or copolymer, an ethylene vinyl acetate polymer or copolymer, a styrene-butadiene polymer or copolymer, a polyacrylamide polymer or copolymer, a natural rubber latex, a natural starch, a synthetic starch, and/or casein.

3. The wall compound of any of the preceding embodiments, wherein the latex resin or resin binder is 100% acrylate.

4. The wall compound of any of the preceding embodiments, wherein the latex resin or resin binder includes a resin blend.

5. The wall compound of embodiment 4, wherein the resin blend includes one latex resin and one non-latex resin.

6. The wall compound of any of the preceding embodiments, wherein the latex resin or resin binder has a Tg of at least 15.

7. The wall compound of any of the preceding embodiments, wherein the compound has a yield stress value of at least 200 and no greater than 1000 Pa.

8. The wall compound of any of the preceding embodiments, wherein the thickener includes an alkali swellable emulsion.

9. The wall compound of embodiment 8, wherein the thickener package further includes a hydrophilic alkali swellable emulsion.

10. The wall compound of claim 8 or 9, wherein the thickener packaging further includes a polyurethane based thickener.

11. The wall compound of any of the preceding embodiments, wherein the thickener is present in an amount of about 1% by weight or less.

12. The wall compound of any of the previous embodiments, wherein the first fiber type has a nominal length and the second fiber type has a nominal length and the nominal length of the first fiber type is less than the nominal length of the second fiber type.

13. The wall compound of embodiment 13, wherein the nominal length of the first fiber type is at least 10 times less than the nominal length of the second fiber type.

14. The wall compound of embodiment 12, wherein the fibers include hydrophobic dry fibrillated polyethylene fibers and hydrophilic rayon fibers.

15. The wall compound of embodiment 14, comprising a bimodal particle size mixture of larger synthetic inorganic filler particles and smaller synthetic inorganic filler particles.

16. The wall compound of embodiment 15, having a particle size ratio of larger size synthetic inorganic filler particles to smaller size synthetic inorganic filler particles of at least about 5:1.

17. The wall compound of any of embodiments 15-16, wherein the filler is at least one of glass bubbles and ceramic microspheres.

18. The wall compound of any of the preceding embodiments, further comprising an adhesion promoter, an activator, a pH control agent, a colorant, a primer, a smoothing agent, water, and/or a preservative.

19. The wall compound of any of the preceding embodiments, further comprising titanium dioxide present in an amount of between about 5% by weight and about 20% by weight.

20. A wall compound comprising: a latex resin or resin binder, a thickener package comprising an alkali swellable emulsion; two more types of fibers; and glass bubbles.

21. The wall compound of embodiment 20, wherein the first fiber type has a nominal length and the second fiber type has a nominal length and the nominal length of the first fiber type is less than the nominal length of the second fiber type.

22. The wall compound of embodiment 20 or 21, wherein the nominal length of the first fiber type is at least 10 times less than the nominal length of the second fiber type.

23. The wall compound of any of embodiments 20-22, wherein the fibers include hydrophobic dry fibrillated fibers and hydrophilic fibers.

24. The wall compound of any of embodiments 23, wherein the fibers include hydrophobic dry fibrillated polyethylene fibers and hydrophilic rayon fibers.

25. The wall compound of any of embodiments 20-24, wherein the latex resin or resin binder is one of a vinyl acrylic polymer or copolymer, an acrylic polymer or copolymer, an acrylate polymer or copolymer, a polyvinyl acetate polymer or copolymer, an ethylene vinyl acetate polymer or copolymer, a styrene-butadiene polymer or copolymer, a polyacrylamide polymer or copolymer, a natural rubber latex, a natural starch, a synthetic starch, and/or casein.

26. The wall compound of any of embodiments 20-25, wherein the latex resin or resin binder is 100% acrylate.

27. The wall compound of any of embodiments 20-26, wherein the thickener includes an HEUR.

28. The wall compound of any of embodiments 20-27, wherein the thickener includes a hydrophilic alkali swellable emulsion.

29. The wall compound of any one of embodiments 20-28, comprising a bimodal particle size mixture of larger synthetic inorganic filler particles and smaller synthetic inorganic filler particles.

30. The wall compound of embodiment 29, having a particle size ratio of larger size synthetic inorganic filler particles to smaller size synthetic inorganic filler particles of at least about 5:1.

31. The wall compound of any of embodiments 20-30, further comprising an adhesion promoter, an activator, a pH control agent, a colorant, a primer, a smoothing agent, water, and/or a preservative.

32. The wall compound of any of embodiments 20-31, further comprising titanium dioxide, present in an amount of between about 5% by weight and about 20% by weight.

33. The wall compound of any of embodiments 24-32, wherein the wall compound is a yield stress fluid and has a density of not greater than 6 lbs/gal.

34. A kit, comprising: the wall compound of any of embodiments 1-33; a tool for applying, smoothing, or removing the wall compound.

35. The kit of embodiment 34, further including instructions for using at least one of the kit the wall compound and the tool.

36. A method for affixing and holding two panels together at a joint seam, the method comprising: creating a joint seam by positioning two panels such that the panels abut, and applying the wall compound of embodiment 1-33 to the joint seam and some panel surface area around the seam.

37. The method of embodiment 36, wherein the wall compound is allowed to dry and create a film, and wherein the method further comprises applying at least one coat of a wall compound over at least a portion of the film.

38. The method of embodiment 36, wherein the method is performed without joint reinforcement tape.

39. The method of embodiment 36, wherein at least one of the panels includes gypsum.

40. The method of embodiment 39, wherein the method further comprises applying at least one coat of a finishing compound over at least a portion of the film, the finishing compound including a latex resin or resin binder, a thickener package, filler, and optionally other additives.

EXAMPLES

In order that aspects of the present disclosure can be more fully understood, the following examples are set forth. It should be understood that these examples are for illustrative purposes only, and are not to be construed as limiting the present disclosure in any manner.

Rheology Test Method

The shear viscosity and yield stress of the compounds was measured using a DHR-2 stress controlled rotational rheometer using 25 mm parallel plates (available from TA Instruments, New Castle, Del.). Temperature was controlled to 25° C. using a water-cooled Peltier stage. The samples were loaded onto the stage and compressed to a thickness of 1.05 mm to fully fill the gap between the parallel plates. (Whenever possible, tested samples were taken from the bottom of the jar to avoid dried out material on the top of the jar, and were sampled without mixing to minimize the addition of shear history prior to testing.) The sample edges were trimmed and then the gap was set to 1 mm. The stress ramp was then conducted by shearing the sample over a range of ascending shear stresses, steadily increasing the stress from 0 Pa to 10,000 Pa linearly over the course of 60 seconds. (In most cases, the experiment stopped prior to reaching the 10,000 Pa stress point, due to the high stresses spinning some material out from between the plates.)

Yield stress was measured as the onset point where the viscosity dropped over one order of magnitude over a narrow range of shear rates. Onset points were determined by performing linear fitting to the viscosity both in the low-stress range (where viscosity was largely independent of the applied stress) and in the highest-slope region of the curve, and finding the stress value at which the two linear fits intersect.

Materials

A glossary of materials used in the Examples is provided in Table 1.

TABLE 1

| RM | Chemical Name | Vendor |
|---|---|---|
| ENCOR 626 | 100% Acrylic Latex (50% by weight solids, in water) | Arkema Emulsion Systems, Cary, NC |
| ENCOR 627 | 100% Acrylic Latex (43.5% by weight solids, in water) | Arkema Emulsion Systems, Cary, NC |
| POLYPHASE P20T | Fungicide solution Active ingredient: 3-Iodo-2-propynyl butyl carbamate (20%% by weight solids, in water) | Troy Corporation, Florham Park, NJ |
| MERGAL 186 | Liquid preservative 4,4-Dimethyloxazolidine | Troy Corporation, Florham Park, NJ |
| Propylene Glycol Butyl Ether | Propylene Glycol n-Butyl Ether | Sigma-Aldrich |
| MONARCH 120 | Carbon Black | Cabot Corporation, Boston, MA |
| AMP-95 | 2-Amino-2-methyl-1-propanol solution (95% by weight solids, in water) | Angus Chemical Company, Buffalo Grove, IL |
| RHEMECH 4800 | Acrylic copolymer aqueous dispersion (30% by weight total solids) | Coatex (Arkema Group) |
| COAPUR XS 83 | Polyurethane aqueous solution (30% by weight total solids) | Coatex (Arkema Group) |
| RHEOTECH M02 | Acrylic copolymer aqueous dispersion (30% by weight total solids) | Coatex (Arkema Group) |
| CARBOWAX 8000 | Polyethylene Glycol (PEG), ~8000 MW | Dow Chemical Company, Midland, MI |
| CARBOWAX 400 | Polyethylene Glycol (PEG), ~400 MWD | Chemical Company, Midland, MI |
| Mineral Oil | Mineral oil | Sigma-Aldrich |
| SHORT STUFF E380F | Fibrillated high density polyethylene fibers (~0.55-0.80 mm length, 15 microns diameter) | MiniFIBERS, Inc., Johnson City, TN |
| Rayon Fiber | 4.5 denier per filament, regular tenacity viscose rayon fibers (0.125" or 0.25" lengths) | MiniFIBERS, Inc., Johnson City, TN |
| Chartwell B-515.71W | Adhesion promoter, an amino functional metal organic compound (33% by weight solids, in water) | Chartwell International, Inc., Dudley, MA |
| RHODOLINE FT 100 | Freeze thaw stabilizer Poly(oxy-1,2-ethanediyl), alpha.-[tris(1-phenylethyl)phenyl]-.omega.-hydroxy- | Solvay USA, Inc., Princeton, NJ |
| RHODOLINE 622 | Defoamer Oil/ hydrophobic silica blend, containing additional inorganic hydrophobes | Solvay USA Inc., Princeton, NJ |
| K20 Glass Bubbles | Glass Bubbles | 3M Company, St, Paul, MN |
| iM16K Glass Bubbles | Glass Bubbles | 3M Company, St. Paul, MN |
| Ceramic Microspheres W-210 | Ceramic Microspheres | 3M Company, St. Paul, MN |
| HUBERCARB Q200 | Calcium Carbonate | J. M. Briber Corporation, Edison, NJ |
| TRONOX CR-828 | Titanium dioxide | Tronox Limited, Stamford, CT |
| Zinc Oxide | | Sigma-Aldrich |
| THIXOL 53 L | Liquid acrylic self-associative thickener (30% by weight solids, in water) | Coatex (Arkema Group), Chester, SC |
| PolyGlycerol-3 | | Solvay USA, Inc., Princeton, NJ |

TABLE 1-continued

| RM | Chemical Name | Vendor |
|---|---|---|
| POLYSTEP A-16 | Sodium dodecylbenzene sulfonate anionic surfactant | Stepan Company, Northfield, IL |
| PLURONIC L-62 | Difunctional block copolymer terminating in primary hydroxyl groups (nonionic surfactant) | BASF Corporation, Florhan Park, NJ |
| ECODIS P 30 | Polyacrylic dispersant sodium salt (42% by weight solids, in water) | Coatex (Arkema Group), Chester, SC |
| COADIS BR 85 | Polyether carboxylate dispersant (35% by weight solids, in water) | Coatex (Arkema Group), Chester, SC |

Comparative Examples 1 and 2

Comparative Example 1 was commercially available 3M Wall Repair Fiber Reinforced Compound. Comparative Example 2 was commercially available USG SHEETROCK PLUS 3 Joint Compound.

Examples 3-9

A batch of compounds was prepared by the following general method. The following equipment was provided: stainless steel containers, a high-speed mixer including a Cowles blade (for high shear mixing), and a Hobart mixer including a tool appropriate for low shear mixing.

The acrylic latex and the fibers were initially mixed for 15-20 minutes in the stainless-steel mixing container with the Cowles blade (high shear). The temperature of the mix was maintained at less than 110° F. All remaining components other than the glass bubbles were then added sequentially to the mixing container (using the Cowles blade), but run at a reduced speed to provide good mixing. The pH of the premix was adjusted to pH=9 with AMP-95 if needed.

After the above solution was mixed uniformly, it was transferred to a bowl and glass bubbles were added. All components were then slowly mixed using the Hobart mixer. The compositions of the resultant compounds are summarized in Table 2. The material amounts provided are in weight percent (of the material as supplied by the vendor).

TABLE 2

| | Wall Compound compositions | | | | | | |
|---|---|---|---|---|---|---|---|
| Material | Example 3 | Example 4 | Example 5 | Example 6 | Example 7 | Example 8 | Example 9 |
| ENCOR 626 | | | 43.2 | | 45.3 | 45.5 | 45.5 |
| ENCOR 627 | 44.0 | 48.0 | | 40.2 | | | |
| SHORT STUFF E380F | 0.25 | 0.25 | 0.25 | 0.10 | 0.40 | 0.25 | 0.25 |
| Rayon Fiber (0.125 in length) | 0.45 | 0.45 | 0.45 | 0.20 | 0.45 | | 0.15 |
| Rayon Fiber (0.25 in length) | | | | | | 0.45 | 0.30 |
| Chartwell B-515.71W | 0.25 | 0.25 | 0.25 | | 0.25 | 0.25 | 0.25 |
| RHEOTECH 4800 | | | 0.20 | | 0.15 | 0.15 | 0.13 |
| COAPUR XS 83 | 0.30 | 0.25 | 0.05 | 0.25 | 0.10 | 0.10 | 0.10 |
| RHEOTECH M 02 | | | | | | | 0.20 |
| POLYPHASE P20T | 0.30 | 0.30 | 0.30 | 0.30 | 0.30 | 0.30 | 0.30 |
| MERGAL 186 | 0.15 | 0.15 | 0.15 | 0.15 | 0.15 | 0.15 | 0.15 |
| Propylene Glycol Butyl Ether | 0.50 | 1.00 | 1.00 | 0.25 | 0.25 | 0.50 | 0.50 |
| AMP-95 | 0.10 | 0.10 | 0.10 | | 0.10 | 0.10 | 0.10 |
| RHODOLINE FT 100 | 0.80 | 0.80 | 0.80 | 0.80 | 0.80 | 0.80 | 0.80 |
| RHODOLINE 622 | 0.06 | 0.04 | 0.04 | 0.04 | 0.04 | 0.04 | 0.04 |
| MONARCH 120 | 0.003 | 0.003 | 0.003 | 0.003 | 0.003 | 0003 | 0.003 |
| CARBOWAX 8000 | 1.00 | 1.00 | 1.00 | | | 1.00 | 0.50 |
| Mineral Oil | 0.50 | | | | | | |
| TRONOX CR-828 | | | | 9.50 | 8.50 | | |
| HUBERCARB Q200 | 2.00 | 2.00 | 2.00 | | | 2.00 | 2.00 |
| Ceramic Microspheres W-210 | | 5.00 | 5.00 | 11.00 | | | |
| iM16K Glass Bubbles | 4.00 | | | | 4.50 | 8.00 | 5.50 |
| K20 Glass Bubbles | 22.00 | 20.00 | 20.00 | 19.00 | 20.0 | 20.00 | 21.00 |
| Water | 23.34 | 20.41 | 25.21 | 18.21 | 18.71 | 20.41 | 22.23 |

Figure 2:
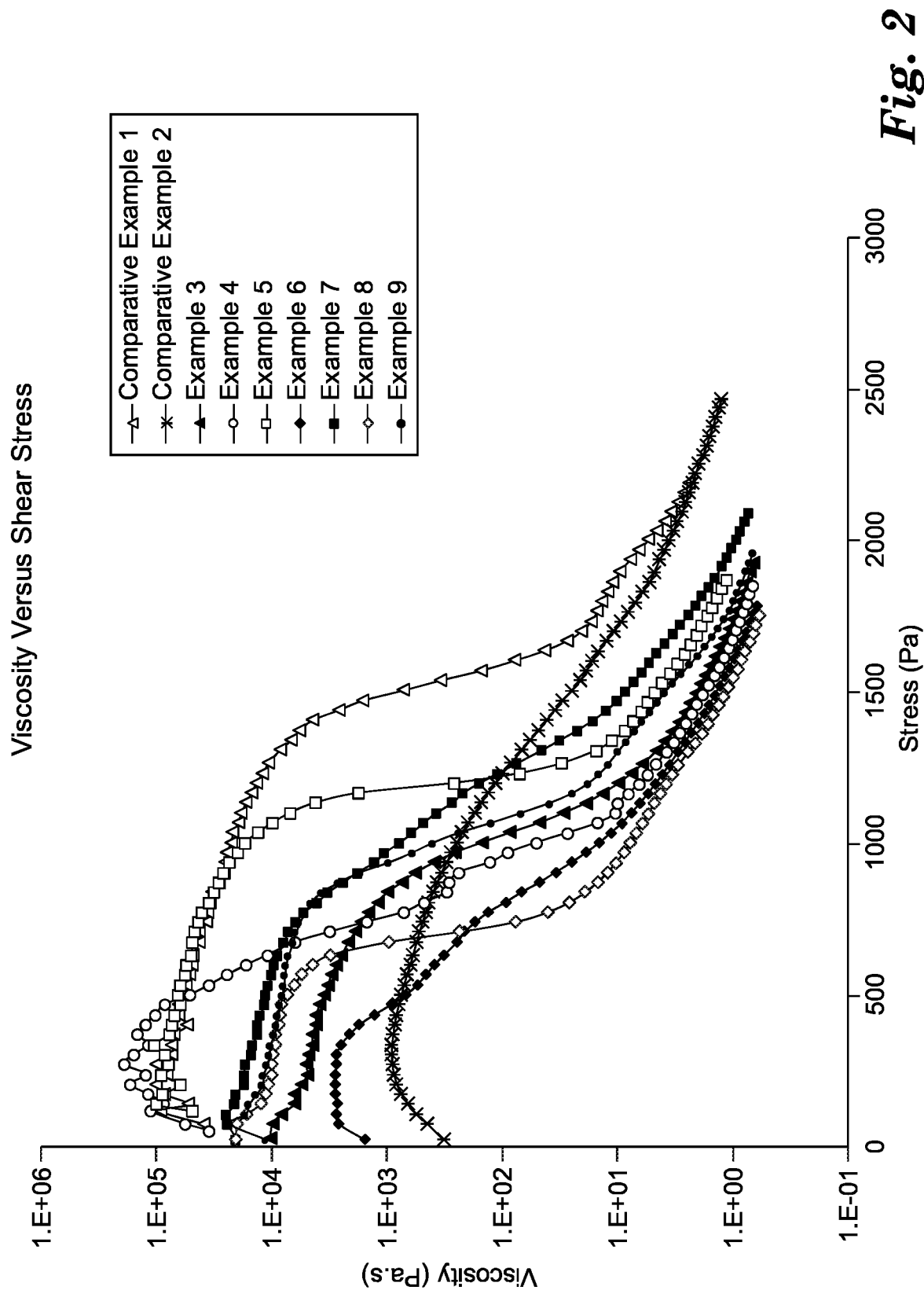
FIG. 2 is a graph illustrating the flow of wall compounds under escalating shear stress.

The rheological behavior of Comparative Examples 1 and 2 and Examples 3-9 were tested using the Rheology Test Method described above. Results are provided in Table 3 and are graphically represented in FIG. 2.

TABLE 3

Yield stress and low-stress viscosity comparison.

| Material | Yield stress (Pa) | Viscosity (Pa · s) at 500 Pa stress | Viscosity (Pa · s) at 1000 Pa stress | Viscosity (Pa · s) at 1500 Pa stress |
|---|---|---|---|---|
| Comparative Example 1 | 1410 | 59300 | 22800 | 863 |
| Comparative Example 2 | Not observed | 753 | 251 | 25.7 |
| Example 3 | 895 | 3510 | 160. | 2.05 |
| Example 4 | 434 | 52600 | 53.8 | 1.74 |
| Example 5 | 1130 | 63700 | 17200 | 4.67 |
| Example 6 | 354 | 695 | 14.7 | 1.37 |
| Example 7 | 773 | 11200 | 805 | 8.59 |
| Example 8 | 607 | 7330 | 7.74 | 1.15 |
| Example 9 | 831 | 8090 | 421 | 3.86 |

Except for the Comparative Example 2 compound, all other Example compounds exhibit higher viscosity at low stress, which makes them less likely to run or creep. They also have a rapid drop in viscosity at a yield stress, marked by the "onset" points on the graph in FIG. 2. At the yield stress, they transition from no flow (very high viscosity) to easy flow (low viscosity). The viscosity of the Comparative Example 2 compound gradually drops with stress, and does not have a yield stress at all. This makes it easy to apply this compound to the wall (no minimum stress to overcome before it flows), but it is likely to be more "runny" once it is on the wall.

The wall compounds of the present disclosure provide a marked improvement over previous spackle or joint compounds, particularly in the context of joint filling. In some embodiments, the use of fibers (optionally hydrophobic and hydrophilic fibers of different morphologies) in combination with an appropriate thickener (e.g., HEUR-type thickener and other thickener without cellulosic or clay) provides desirable pseudoplastic-type and/or yield stress behavior. In some embodiments, the use of a bimodal distribution of hollow glass microspheres from two different strength/size curves desirably renders the wall compound lightweight.

Examples 10-14

A batch of finishing compounds was prepared by the general method of Examples 3-9. The compositions of the resultant compounds are summarized in Table 4. The material amounts provided are in weight percent (of the material as supplied by the vendor).

TABLE 4

Finishing Compound compositions

| Material | Example 10 | Example 11 | Example 12 | Example 13 | Example 14 |
|---|---|---|---|---|---|
| HUBERCARB Q200 | 5.0 | 4.30 | 4.30 | 4.30 | 4.30 |
| Ceramic Microspheres W-210 | 5.0 | 5.0 | 5.0 | 5.0 | 5.0 |
| K20 Glass Bubbles | 20.0 | 20.0 | 20.0 | 20.0 | 20.0 |
| ENCOR 626 | 45.0 | 46.0 | 46.0 | 46.0 | |
| ENCOR 627 | | | | | 46.0 |
| Chartwell B-515.71W | 0.25 | 0.25 | 0.25 | 0.25 | 0.25 |
| RHEOTECH 4800 | 0.050 | | 0.20 | | |
| COAPUR XS 83 | 0.10 | 0.20 | | | 0.20 |
| RHEOTECH M 02 | | | | 0.20 | |
| POLYPHASE P20T | 0.20 | 0.20 | 0.20 | 0.20 | 0.20 |
| MERGAL 186 | 0.10 | 0.10 | 0.10 | 0.10 | 0.10 |
| Propylene Glycol Butyl Ether | 0.50 | 1.00 | 1.00 | 1.00 | 1.00 |
| AMP-95 | 0.10 | 0.10 | 0.10 | 0.10 | 0.10 |
| RHODOLINE FT 100 | 0.80 | 0.80 | 0.80 | 0.80 | 0.80 |
| MONARCH 120 | 0.004 | 0.004 | 0.004 | 0.004 | 0.004 |
| CARBOWAX 8000 | | 0.10 | 0.10 | 0.10 | 0.10 |
| Water | 22.90 | 21.95 | 21.95 | 21.95 | 21.95 |

Examples 15-19

A batch of compounds was prepared by the general method of Examples 3-9. The compositions of the resultant compounds are summarized in Table 5. The material amounts provided are in weight percent (of the material as supplied by the vendor).

TABLE 5

Finishing Compound compositions

| Material | Example 15 | Example 16 | Example 17 | Example 18 | Example 19 |
|---|---|---|---|---|---|
| POLYPHASE P20T | 0.19 | 0.19 | 0.19 | 0.18 | 0.15 |
| MERGAL 186 | 0.10 | 0.10 | 0.10 | 0.10 | 0.10 |

TABLE 5-continued

Finishing Compound compositions

| Material | Example 15 | Example 16 | Example 17 | Example 18 | Example 19 |
|---|---|---|---|---|---|
| Propylene Glycol Butyl Ether | 0.25 | 0.50 | 0.50 | 0.50 | 0.40 |
| PolyGlycerol-3 | 1.00 | 1.50 | 1.50 | 1.40 | 1.00 |
| COADIS BR 85 | 0.80 | 0.80 | 0.80 | 0.75 | 0.60 |
| AMP-95 | 0.10 | 0.10 | 0.10 | 0.10 | 0.10 |
| RHODOLINE FT-100 | 0.80 | 0.80 | 0.80 | 0.75 | 0.60 |
| RHODOLINE 622 | 0.03 | 0.03 | 0.01 | 0.030 | 0.2 |
| Chartwell B-515.71W | 0.25 | 0.25 | 0.25 | 0.25 | 0.25 |
| POLYSTEP A16 | | 1.00 | | 0.50 | |
| MONARCH 120 | 0.004 | 0.004 | 0.004 | 0.004 | 0.003 |
| ENCOR 626 | 45.0 | 40.0 | 40.0 | 37.0 | 30.0 |
| HUBERCARB Q200 | 9.00 | 6.0 | 30.00 | 14.5 | 46.0 |
| Zinc Oxide | 1.00 | 1.00 | | 0.50 | |
| TRONOX CR-828 | 5.00 | 5.00 | 5.00 | 4.50 | 4.00 |
| THIXOL 53 L | 0.50 | 0.40 | 0.40 | 0.40 | 0.30 |
| RHEOTECH M 02 | | 0.10 | 0.10 | 0.10 | 0.10 |
| iM16K Glass Bubbles | 3.5 | 6.0 | | 5.5 | |
| K20 Glass Bubbles | 18.5 | 18.0 | 10.0 | 16.5 | 10.0 |
| Water | 13.98 | 18.23 | 10.25 | 16.44 | 6.38 |

Examples 20-32

A batch of compounds was prepared by the general method of Examples 3-9. The compositions of the resultant compounds are summarized in Tables 6 and 7. The material amounts provided are in weight percent (of the material as supplied by the vendor).

TABLE 6

Wall Compound compositions

| Material | Example 20 | Example 21 | Example 22 | Example 23 | Example 24 | Example 25 |
|---|---|---|---|---|---|---|
| iM16K Glass Bubbles | 4.5 | 4.5 | 3.5 | 4.5 | 4.5 | 4.5 |
| K-20 Glass Bubbles | 21.0 | 21.0 | 18.0 | 21.0 | 21.0 | 21.0 |
| TRONOX CR-828 | | | 5.00 | | | |
| Polyphase P20T | 0.19 | 0.19 | 0.19 | 0.19 | 0.19 | 0.19 |
| MERGAL 186 | 0.10 | 0.10 | 0.10 | 0.10 | 0.10 | 0.10 |
| Propylene Glycol Butyl Ether | 0.25 | 0.25 | 0.25 | 0.25 | 0.25 | 0.25 |
| CARBOWAX 400 | 3.00 | | 1.00 | | | |
| PolyGlycerol-3 | | 3.00 | | 1.00 | | 1.00 |
| POLYSTEP A-16 | | | | 1.00 | 1.00 | |
| PLURONIC L-62 | 2.00 | 2.00 | | | | |
| ECODIS P 30 | 0.50 | | | 0.50 | 0.50 | 0.50 |
| COADIS BR 85 | | 0.80 | 0.80 | | | |
| SHORT STUFF E380F | 0.35 | 0.35 | 0.35 | 0.35 | 0.35 | 0.35 |
| Rayon Fiber | 0.40 | 0.40 | 0.40 | 0.40 | 0.40 | 0.40 |
| AMP-95 | 0.10 | 0.10 | 0.10 | 0.10 | 0.10 | 0.10 |
| RHODOLINE FT 100 | 0.80 | 0.80 | 0.80 | 0.80 | 0.80 | 0.80 |
| RHODOLINE 622 | 0.03 | 0.03 | 0.03 | 0.03 | 0.03 | 0.03 |
| Chartwell B-515.71W | 0.25 | 0.25 | 0.25 | 0.25 | 0.25 | 0.25 |
| MONARCH 120 | 0.004 | 0.004 | 0.004 | 0.004 | 0.004 | 0.004 |
| HUBERCARB Q200 | 8.00 | 8.00 | 7.84 | 6.00 | 6.00 | 6.00 |
| ENCOR 626 | 46.2 | 46.2 | 45.0 | 47.0 | 47.0 | 47.0 |
| Ceramic Microsphere W-210 | | | | | | |
| THIXOL 53 L | 0.30 | 0.30 | 0.50 | 0.50 | 0.50 | 0.50 |
| RHEOTECH M 02 | 0.20 | 0.20 | | | | |
| Zinc Oxide | | | 1.0 | 1.0 | 1.0 | 1.0 |
| Water | 11.83 | 11.53 | 14.89 | 15.03 | 16.03 | 16.03 |

TABLE 7

Wall Compound compositions

| Material | Example 26 | Example 27 | Example 28 | Example 29 | Example 30 | Example 31 | Example 32 |
|---|---|---|---|---|---|---|---|
| iM16K Glass Bubbles | 4.5 | 4.5 | 4.5 | 4.5 | 3.5 | 4.5 | 4.3 |
| K-20 Glass Bubbles | 21.0 | 21.0 | 21.0 | 21.0 | 18.0 | 18.0 | 18.0 |
| TRONOX CR-828 | | | | | 5.00 | 6.0 | 3.5 |
| POLYPHASE 20T | 0.19 | 0.19 | 0.19 | 0.19 | 0.19 | 0.25 | 0.25 |
| MERGAL 186 | 0.10 | 0.10 | 0.10 | 0.10 | 0.10 | 0.10 | 0.10 |
| Propylene Glycol Butyl Ether | 0.25 | 0.25 | 0.25 | 0.25 | 0.25 | 0.50 | 0.50 |
| CARBOWAX 400 | | | | | | | |
| PolyGlycerol-3 | 1.00 | | 1.00 | 1.00 | 1.00 | | |
| POLYSTEP A-16 | 1.00 | 1.00 | | | | | |
| PLURONIC L-62 | | | | | | | |
| ECODIS P 30 | | | | | | | |
| COADIS BR 85 | 0.80 | 0.80 | 0.80 | 0.80 | 0.80 | | |
| SHORT STUFF E380F | 0.35 | 0.35 | 0.35 | 0.35 | 0.35 | 0.40 | 0.40 |
| Rayon Fiber | 0.40 | 0.40 | 0.40 | 0.40 | 0.40 | 0.30 | 0.30 |
| AMP-95 | 0.10 | 0.10 | 0.10 | 0.10 | 0.10 | 0.05 | 0.05 |
| RHODOLINE FT 100 | 0.80 | 0.80 | 0.80 | 0.80 | 0.80 | 0.63 | 0.56 |
| RHODOLINE 622 | 0.03 | 0.03 | 0.01 | 0.03 | 0.03 | 0.02 | 0.02 |
| Chartwell B-515.71W | 0.25 | 0.25 | 0.25 | 0.25 | 0.25 | 0.25 | 0.25 |
| MONARCH 120 | 0.004 | 0.004 | 0.004 | 0.004 | 0.004 | 0.08 | 0.08 |
| HUBERCARB Q200 | 6.00 | 6.00 | 6.00 | | 6.00 | 5.00 | 7.30 |
| ENCOR 626 | 46.2 | 46.2 | 45.0 | 47.0 | 47.0 | 40.00 | 40.00 |
| Ceramic Microsphere W-210 | | | | 6.00 | | | |
| THIXOL 53 L | 0.50 | 0.50 | 0.50 | 0.50 | 0.50 | 0.40 | 0.20 |
| RHEOTECH M 02 | 0.20 | 0.20 | | | | 0.20 | 0.50 |
| Zinc Oxide | 1.0 | 1.0 | 1.0 | 1.0 | 1.0 | | |
| Water | 15.33 | 16.33 | 17.75 | 15.73 | 14.73 | 23.32 | 23.70 |

The rheological behavior of Examples 20, 21, 31, and 32 were tested using the Rheology Test Method described above. Results are provided in Table 8.

TABLE 8

Yield stress and low-stress viscosity comparison.

| Material | Yield stress (Pa) | Viscosity (Pa · s) at 500 Pa stress | Viscosity (Pa · s) at 1000 Pa stress | Viscosity (Pa · s) at 1500 Pa stress |
|---|---|---|---|---|
| Example 20 | 753 | 25100 | 92.9 | 9.08 |
| Example 21 | 2670 | 589000 | 538000 | 330000 |
| Example 31 | 693 | 3970 | 61.5 | 5.81 |
| Example 32 | 11330 | 22800 | 5170 | 108 |

The recitation of all numerical ranges by endpoint is meant to include all numbers subsumed within the range (i.e., the range 1 to 10 includes, for example, 1, 1.5, 3.33, and 10).

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

What is claimed is:

1. A wall compound comprising:
   a latex resin or resin binder present in an amount of about 50% by weight or less, based on the total weight of the compound;
   a thickener package including a hydrophilic alkali swellable emulsion, wherein the thickener package is present in amount of 1% by weight or less, based on the total weight of the compound;
   hydrophobic dry fibrillated fibers and hydrophilic fibers; and
   a filler material consisting of substantially spherical synthetic inorganic filler, wherein the wall compound exhibits yield stress behavior, having a yield stress value of at least 200 and no greater than 1000 Pa, and wherein the compound exhibits a Viscosity at 1500 Pa of stress of no greater than 10 Pa·s, each as measured according to the description.

2. The wall compound of claim 1, wherein the latex resin or resin binder is at least one of a vinyl acrylic polymer or copolymer, an acrylic polymer or copolymer, an acrylate polymer or copolymer, a polyvinyl acetate polymer or copolymer, an ethylene vinyl acetate polymer or copolymer, a styrene-butadiene polymer or copolymer, a polyacrylamide polymer or copolymer, a natural rubber latex, a natural starch, a synthetic starch, and casein.

3. The wall compound of claim 1, wherein the latex resin or resin binder is 100% acrylate.

4. The wall compound of claim 1, wherein the compound exhibits a Viscosity at 1500 Pa of stress of no greater than 9 Pa·s.

5. The wall compound of claim 1, wherein the thickener package includes a polyurethane based rheology modifier.

6. The wall compound of claim 1, The wall compound of any of the preceding claims, wherein the fibers are present in total in an amount of no greater than 3% by weight, based on the total weight of the compound.

7. The wall compound of claim 1, wherein the hydrophobic dry fibrillated fibers have a length and the hydrophilic fibers have a length and the length of the hydrophobic dry fibrillated fibers is less than the length of the hydrophobic fibers.

8. The wall compound of claim 7, wherein the fibers include hydrophobic dry fibrillated polyethylene fibers and hydrophilic rayon fibers.

9. The wall compound of claim 1 wherein the filler is at least one of glass bubbles and ceramic microspheres.

10. The wall compound of claim 1, further comprising at least one of an adhesion promoter, a humectant, a surfactant, a dispersing agent, an activator, a pH control agent, a colorant, a primer, a smoothing agent, water, and a preservative.

11. The wall compound of claim 1, further comprising titanium dioxide present in an amount of between about 5% by weight and about 20% by weight.

12. The wall compound of claim 1, wherein the thickener includes an HEUR and the alkali swellable emulsion.

13. The wall compound of claim 1, wherein the wall compound is a yield stress fluid and has a density of not greater than 6 lbs/gal.

14. A method for affixing and holding two panels together at a joint seam, the method comprising: creating a joint seam by positioning two panels such that the panels abut; and applying the wall compound of claim 1 to the joint seam and some panel surface area around the seam.

15. The method of claim 14, wherein the wall compound is allowed to dry and create a film, and wherein the method further comprises applying at least one coat of a wall compound over at least a portion of the film.

16. The method of claim 14, wherein the method is performed without joint reinforcement tape.

17. A wall compound comprising:
  a latex resin or resin binder; present in an amount of about 50% by weight or less, based on the total weight of the compound;
  a thickener package comprising a rheology modifier and a hydrophilic alkali swellable emulsion;
  two or more types of fibers; and
  glass bubbles, wherein the wall compound exhibits yield stress behavior, having a yield stress value of at least 200 and no greater than 1000 Pa, and wherein the compound exhibits a Viscosity at 1500 Pa of stress of no greater than 10 Pa·s, each as measured according to the description.

18. The wall compound of claim 17, wherein the fibers include hydrophobic dry fibrillated polyethylene fibers and hydrophilic rayon fibers.

* * * * *